United States Patent
Cooke, Jr.

(10) Patent No.: US 7,569,523 B2
(45) Date of Patent: Aug. 4, 2009

(54) METHOD AND MATERIALS FOR HYDRAULIC FRACTURING OF WELLS USING A LIQUID DEGRADABLE THERMOPLASTIC POLYMER

(76) Inventor: Claude E. Cooke, Jr., 197 Lake View Cir., Montgomery, TX (US) 77356

( * ) Notice: Subject to any disclaimer, the term of this patent is extended or adjusted under 35 U.S.C. 154(b) by 0 days.

(21) Appl. No.: 12/319,741

(22) Filed: Jan. 12, 2009

(65) Prior Publication Data

US 2009/0131286 A1 May 21, 2009

Related U.S. Application Data

(62) Division of application No. 11/198,245, filed on Aug. 5, 2005, now Pat. No. 7,476,644, which is a division of application No. 10/253,302, filed on Sep. 24, 2002, now Pat. No. 6,949,491.

(60) Provisional application No. 60/325,071, filed on Sep. 26, 2001, provisional application No. 60/340,224, filed on Dec. 7, 2001.

(51) Int. Cl.
 *E21B 43/26* (2006.01)
 *E21B 43/267* (2006.01)
 *C09K 8/68* (2006.01)

(52) U.S. Cl. .................. 507/260; 166/308.1; 166/308.2; 507/203; 507/219; 507/267

(58) Field of Classification Search ................ 507/260, 507/203, 219, 267; 166/308.1, 308.2
See application file for complete search history.

(56) References Cited

U.S. PATENT DOCUMENTS

| 4,716,964 | A | * | 1/1988 | Erbstoesser et al. ......... 166/284 |
| 5,103,913 | A | * | 4/1992 | Nimerick et al. ......... 166/308.2 |
| 5,439,059 | A | * | 8/1995 | Harris et al. ................ 166/300 |

* cited by examiner

*Primary Examiner*—Timothy J Kugel
(74) *Attorney, Agent, or Firm*—Claude E. Cooke, Jr.; Burleson Cooke L.L.P.

(57) ABSTRACT

Hydraulic fracturing of wells by injecting a degradable polymer phase as a fracturing fluid is provided. Composition and degree of polymerization of the degradable polymer and the selection of additives may be varied to adjust the viscosity, degradation time and other properties of the fracturing fluid. Viscous degradable fluid or pellets of degradable polymer may be placed in a wellbore as an internal phase in a low viscosity carrier fluid. A polymer-continuous liquid phase may be formed at a selected location in the wellbore, usually near perforations, before the polymer phase is pressured into a formation to form a hydraulic fracture.

19 Claims, 3 Drawing Sheets

METHOD AND MATERIALS FOR HYDRAULIC FRACTURING OF WELLS USING A LIQUID DEGRADABLE THERMOPLASTIC POLYMER

This application is a Divisional Application of application Ser. No. 11/198,245, filed Aug. 5, 2005, now U.S. Pat. No. 7,476,644, which is a Divisional Application of application Ser. No. 10/253,302, filed Sep. 24, 2002, now U.S. Pat. No. 6,949,491, which claims the benefit of U.S. Provisional Application No. 60/325,071, filed Sep. 26, 2001 and U.S. Provisional Application No. 60/340,224, filed Dec. 7, 2001.

BACKGROUND OF THE INVENTION

1. Field of Invention

This invention pertains to treating wells to increase production rate by hydraulic fracturing. More particularly, methods are provided for increasing flow rate of wells by injecting a highly viscous material, which may be a thermoplastic degradable polymer, which may contain proppant particles, into an earth formation surrounding a well. In other embodiments, methods are provided to improve conventional hydraulic fracturing and sand control processes.

2. Discussion of Related Art

Hydraulic fracturing of earth formations around a wellbore for increasing fluid productivity or injectivity of the well is a mature technology. Normally, thousands of gallons of an oil-based or water-based fluid, usually made viscous by addition of a soluble polymer, are injected into a formation at an injection rate such that the pressure of the fluid at the formation is higher than the earth stress in the formation. This causes a crack or fracture to develop in the face of the rock at the wellbore. Continued fluid injection into the well then causes the fracture to increase in length and width. After a sufficient width is achieved by continued fluid injection, particles, called "proppant," are added to the fluid. The fluid injected up until the time proppant is added is called "pad" fluid. After fluid injection has ceased, fracturing fluid flows out of the fracture, allowing the walls of the fracture to close on the proppant. The proppant particles then "prop" the walls of the fracture apart. Since proppant particles are normally much larger than the particles of the formation, the fluid permeability of the propped fracture is much greater than that of the formation; hence, the flow capacity of the well is increased. Fractures are often propped out to distances from about 200 feet to thousands of feet in each of two opposite directions from the wellbore in low permeability formations. Fractures as short as 25 feet may be formed in high permeability formations using convention gelled fluids and as short as 5 feet in high permeability formations using water as a fracturing fluid ("Water-Fracturing vs. Frac-Packing: Well Performance Comparison and Completion Type Selection Criteria," SPE 38593, Society of Petroleum Engineers, 1997). The flow rate into a well in a low-permeability formation can be increased several-fold by the hydraulic fracture, depending on the properties of the formation, the proppant and the geometry of the propped fracture. Along with the thousands of gallons of fracturing fluid, thousands of pounds of proppant are normally injected in a fracturing treatment in a low permeability formation, although it has been reported that in some wells injection of fluid alone (i.e., without proppant) at fracturing pressures has increased production rate. At the end of a fracturing treatment, proppant-laden fluid is "flushed" from the wellbore into the formation by a proppant-free displacement fluid, which is usually brine.

In more recent years, application of hydraulic fracturing along with gravel packing of wells has become very common, in a process often called "frac-packing." The formations in which this process is usually applied have high permeability, and the fracture is formed only to bypass permeability damage near a wellbore (SPE 38593, referenced above). It was recognized that a short fracture, in the range of 2 to 8 feet in length, could bypass damage in Gulf of Mexico wells that require sand control (SPE 38593, p. 286). Some evidence exists that conventional fracturing fluids, containing a soluble gelling polymer, damaged the permeability of the longer fractures formed with conventional fluids when gravel packing, whereas much shorter fractures formed with water appeared to be just as effective.

For hydraulic fractures formed by conventional processes to be effective, the fracture must be propped all the way to the wellbore. Even a short distance of unpropped fracture or of proppant with damaged permeability can greatly diminish or even eliminate the benefits of the long propped fracture. Therefore, there is need for materials and method to connect long propped hydraulic fractures in wells that have already been fractured all the way to the wellbore and eliminate any lack of proppant or damage to the propped fracture within a relatively short distance from a wellbore.

There is also a need for a method to prevent "overflushing" of proppant away from the wellbore by the displacement fluid at the end of a conventional fracturing treatment. Overflushing can be responsible for the lack of proppant in the fracture very near the wellbore.

In some hydraulic fracturing treatments, "flowback" of proppant is observed when the well is produced. This is a need for method to prevent this flow of proppant out of the fracture and into the wellbore after a fracturing treatment.

One of the benefits from hydraulic fracturing of many wells is removal of "damage" to flow capacity near a well. Damage removal in connection with gravel packing of very high permeability formations was discussed above, but damage to flow capacity of wells in all permeability ranges is widely observed. The mechanisms causing damage have been studied extensively, and include: clay blockage from drilling fluids, damage to rock permeability from shooting perforations into the formation, perforation plugging or formation damage from leakoff of completion fluids, migration of fine particles from the formation to the near-well region, and deposition of chemical scales from produced or injected water, or combinations of these phenomena. The distance to which damage extends from a wellbore is not known in each well, but it is generally believed to be not more than a few feet. Well stimulation methods that are generally used for damage removal near a wellbore include limestone and sandstone acidizing and solvent injection, but often these treatments are not successful or their effectiveness quickly diminishes as fluid is produced from a well. A hydraulic fracturing method and materials are needed to form a propped fracture having a high fluid flow capacity and extending only through the damage zone near a wellbore, or a relatively short distance from a wellbore, without the requirements of pumping large amounts of fluid and proppant into the well. The method should be applicable to a wide range of permeabilities of the formation around the well. This method can be especially needed in remote areas, where mobilizing of materials and equipment is expensive. The method is also needed to remove damage before gravel packing a well.

Theoretical models to predict the geometry of hydraulic fractures formed around wells have been developed. The models generally indicate that the width of a fracture at the wellbore increases with effective viscosity of the injected fluid in the fracture, rate of fluid injection and volume of fluid injected. To achieve a fracture width that can accept proppant without using large quantities of fluid, effective viscosity of the fracturing fluid must be high. But, viscosity of a fracturing fluid is normally limited by pressure loss as the fluid is pumped down a wellbore. Presently-used fracturing fluids minimize this pressure loss by employing polymer solutions that are highly non-Newtonian (shear-thinning). Otherwise, pressure loss due to friction in the tubing would allow injection only at very small rates. Water-soluble polymers are cross-linked to increase viscosity, and this cross-linking is sometimes delayed to decrease pressure loss in tubulars. Another limit on increasing viscosity of present fracturing fluids is that the water-soluble polymers most commonly used do not completely degrade, but leave a residue that adversely affects flow capacity of the proppant left in a fracture. Higher polymer concentrations in the injected fluid to produce higher viscosity and wider fractures would cause even greater damage to proppant flow capacity in the fracture. Other viscous solutions, based on surfactant molecules, have been developed, but they have disadvantages such as the uncertainty of positive reduction of viscosity with time and high cost. All presently used fracturing fluids have the disadvantage that large quantities of liquid must be pumped into a well because the effective viscosity of the fluid in a fracture is limited.

A process using high effective viscosity fracturing fluid for damage removal must provide a method for controlling pressure loss in tubulars when the fluid is injected into a well. A process that allowed pumping high-viscosity oil at a high rate with low friction loss in tubulars by using a "water ring" was developed (the "Superfrac process", "A New Hydraulic Fracturing Process," *J. Pet. Tech.*, January 1970, 89-96). Difficulties in handling the oil and in controlling the process caused the process to lose favor, but the concept of using a lubricating layer in tubing to inject a viscous fracturing fluid was demonstrated. Large quantities of fracturing fluid were employed in this process, also. Since a water ring was used, the viscous oil was not the external phase in the tubing; this made possible low friction loss in tubing. If water was the external phase in a hydraulic fracture, viscous oil did not have high effective viscosity in the fracture, either. The effective viscosity of a viscous oil fracturing fluid flowing in the fracture would have been much lower than the viscosity of the oil, although the high viscosity of the oil was effective for proppant transport. The effective viscosity for flow in a fracture when using the "Superfrac" process is not known.

If a fracturing fluid has high viscosity, the fluid must degrade such that flow can be established through the fracture after the treatment. Therefore, material and method are needed for a fracturing fluid that can be placed in the wellbore near the zone to be fractured without excessive pressure loss in the wellbore, that can provide high effective viscosity in the fracture, and that can provide a method for the fluid to degrade to allow flow of well fluids through the fracture.

SUMMARY OF THE INVENTION

Hydraulic fracturing processes employing a degradable thermoplastic are disclosed. In one embodiment, the degradable plastic may be placed in a wellbore near a formation to be fractured as a dispersed or discontinuous phase in a carrier fluid, so as to control pressure losses in the wellbore during placement. The degradable plastic is then converted to a continuous or external phase and used as the fracturing fluid to form a fracture near a wellbore, such that it has high effective viscosity in the fracture. In other embodiments, the degradable plastic may be injected into a fracture as the discontinuous or internal phase, where high effective viscosity in the fracture is not required. In most applications, at least some of the degradable plastic injected carries a proppant into the fracture. Injection of a degradable plastic phase can be used in a variety of well applications, including: forming a short fracture having length sufficient to bypass damage to permeability near a wellbore; placing proppant near a wellbore in a previously formed fracture; replacing damaged proppant near a wellbore in a previously formed fracture; preventing overflushing of proppant after a fracturing treatment; preventing flowback of proppant after a fracturing treatment; and forming a fracture, that may remain plugged for a selected time, before gravel packing or performing other completion or workover operations are performed in a well.

DETAILED DESCRIPTION OF THE INVENTION

Figure 1:
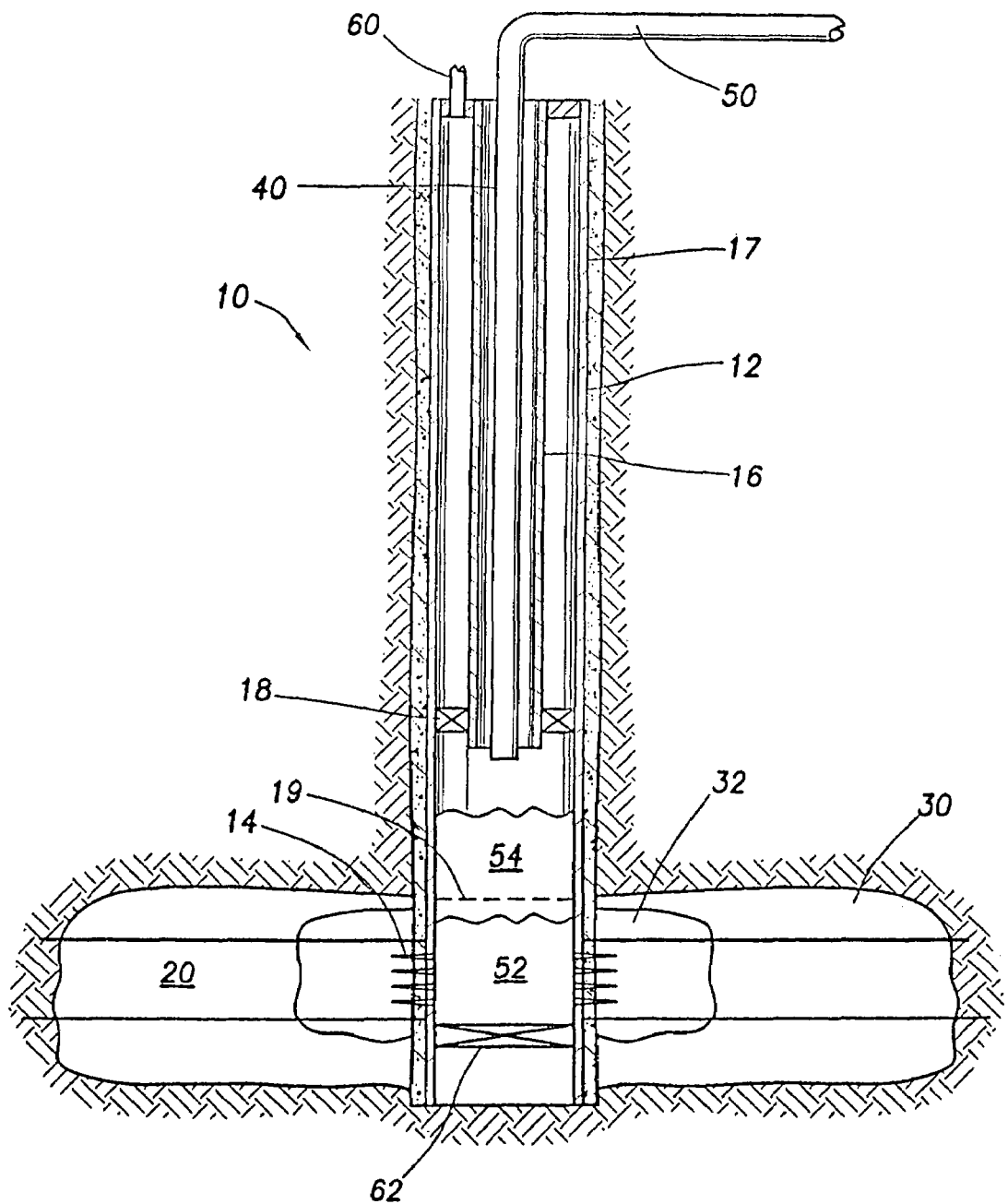
FIG. 1 illustrates a well with cemented casing that is perforated opposite a formation, with tubing and a work string in the wellbore.

Referring to FIG. 1, wellbore 10 penetrates formation 20 where fluid is to be produced or injected. Wellbore 10 has casing 12 extending through formation 20, casing 12 being cemented in place by cement sheath 17. Perforations 14 have been formed through the wall of casing 12 and cement sheath 17 into formation 20. Perforations 14 may extend over the entire thickness of formation 20 or may extend only over a selected interval of formation 20 less than the total thickness surrounding wellbore 10. In some wells, hydraulic fracture 30 may have been formed around wellbore 10 by a previous treatment employing conventional fracturing fluid and proppant, using techniques well-known in industry. Hydraulic fracture 30 may have been formed for a time before injection of the fracturing fluid disclosed herein or may have been formed immediately before injection of the fracturing fluid disclosed herein. Alternatively, fracture 30 may not be present. Tubing 16 may have been suspended inside casing 12 and packer 18 may have been set near the bottom of tubing 16 to seal the annulus between tubing 16 and casing 12. Packer 18 may not be present in some wells, tubing 16 may not be present in some wells, and even casing 12 may not be present in some wells, although most wells in which the methods disclosed here will be applied contain casing and tubing with a packer near the bottom of the tubing. Packer 18 may have a controllable port for circulating fluids in the annulus of the well (not shown) or tubing 16 may be releasable from packer 18 to allow circulation of fluids down the tubing and up the tubing-casing annulus.

In an embodiment for damage removal near wellbore 10, the materials and methods disclosed herein may be used to form short hydraulic fracture 32 around wellbore 10 by injecting the degradable fracturing fluid at a pressure above the fracturing pressure of formation 20. Hydraulic fracture 32 will generally extend less than 200 feet from wellbore 10, although a fracture of greater selected lengths may be formed by proper design of fluid properties and procedures as disclosed herein. The fracturing pressure of formation 20 is generally known from fracturing pressures measured in other wells or in previous fracturing treatments down wellbore 10.

The preferable fracturing fluid disclosed herein is quite different from fracturing fluids normally used, in which a degradable polymer is dispersed in a liquid to increase viscosity of the liquid. The preferred fracturing fluid disclosed herein is described as a "polymer phase" containing a degradable polymer. A polymer phase may be the polymer or a mixture of the polymer and a liquid, which will usually be a carrier fluid. The polymer is present as a bulk phase, i.e., not as a finely divided or disperse material. Additives may be present in the polymer phase. A preferred polymer is degradable by chemical reaction with water. Alternative polymer fracturing fluids for use in this invention include viscous waxes or other flowable materials that may be degraded by solubility in hydrocarbon or aqueous fluids in the formation, polymers that thermally degrade or fluids that degrade by other mechanisms to decrease viscosity. The preferred degradable thermoplastic polymer that is degraded by reaction with water (herein "water-degradable") degrades to mostly water-soluble monomers or oligomers over a period of time in the presence of water.

The use of water-degradable polymers in wells is known. Their use in wellbores for diverting fluids between perforations or decreasing fluid loss from a hydraulic fracture when particles of the polymer are dispersed in fracturing fluid has been disclosed. U.S. Pat. No. 4,716,964, which is incorporated by reference herein, discloses use of such polymers in "ball sealers" and as a fluid loss material in well treating fluids. Ball sealers are added to a well treatment fluid to seal on perforations and divert flow of the treatment fluid to other perforations. Ball sealers are not designed to be injected through the perforations into a formation around a well. Fluid loss additives are finely divided polymer particles that are dispersed in the fracturing fluid and injected, but such additives are not injected as a polymer "phase." The term "phase" as used herein does not include finely divided material. The polymers disclosed in the '964 patent include poly (D,L-lactide) and copolymers of lactide and glycolide.

A significant amount of research and development has been performed in recent years to commercialize polymers that degrade to water-soluble chemicals. One large-scale application of such polymers is to form containers that degrade to water-soluble chemicals in the natural environment or in landfills. A variety of sources of lactic acid have been considered for the polylactic acid (PLA) polymers such as disclosed in the cited patent. Cargill Dow Polymers LLC has built a commercial plant to produce PLA-based resins. Other degradable polymers, including other polyesters (based on polyethylene terephthalate, for example), starches, polycaprolactone, polyhydroxybutyrates and blends of these materials have been developed. "Biomax," a hydro/biodegradable polyester is available from DuPont Company. Properties of lactide polymers are reviewed in the article "Properties of lactic acid based polymers and their correlation with composition," A. Sodergard and M. Stolt, *Prog. in Pol. Sci.*, July, 2002, which is incorporated by reference herein. Chapters of books on the subject of degradable polymers include *Degradable Polymers, Principles and Applications*, Ed. G. Scott and D. Gilead, Chapman & Hall, 1995, Chap. 4, by S. Li and M Vert, and Biodegradable PolyMers and Plastics, Ed. by M. Vert et al, Roy. Soc. of Chem., 1992, chapter on "Non-Microbial Degradation of Polyesters" by C. G. Pitt, both of which are incorporated by reference herein.

Further development is underway for other degradable or biodegradable polymers. Current information on the status of availability of degradable polymers is available on web sites Biopolymer.net, bpsweb.net (Biodegradable Plastics Society), gaen.bch.msu.edu (SINAS, for starches and starch blends) and other sources, as well as websites of the producing companies, for example. The properties of such polymers can be adjusted by molecular weight distribution, crystallinity, co-polymers and additives to control physical properties and degradation time under selected environments. Polymers optimized for the applications disclosed herein can be manufactured using known methods. Different polymerization variables can be controlled during manufacture and/or compounding to provide desirable degradation times under a broad range of environmental conditions that exist in underground formations.

The use of degradable polymers as medical devices has been widely investigated. Some of the results are discussed by Middleton and Tipton ("Synthetic Biodegradable Polymers as Medical Devices," *Medical Plastics and Biomaterials Magazine*, March 1998). Chemical hydrolysis of the hydrolytically unstable backbone is the primary mechanism for degradation of the lactide polymer. Degradation occurs first by water penetrating the bulk of the polymer, preferentially attaching the chemical bonds in the amorphous polymer and converting long chains into shorter water-soluble fragments. Degradation rates can be controlled by incorporation of various additives. The control of properties of thermoplastic polymers by addition of plasticizers and other additives is well known. Of course, exposure of the plastics to moisture before their use can be controlled to prevent premature degradation. Biodegradable polymers may also be degraded by enzymes, which may be used to contact the polymers, as is known in the art. If there is need to increase the degradation rate of polymers left in a wellbore, for example, heating of the polymers in the wellbore can be used to increase degradation rate.

Since water is always present in hydrocarbon reservoirs, there is always a mechanism to cause polymer degradation of water-degradable polymers. Rate of polymer degradation will depend primarily on polymer composition, polymer structure and temperature. For any degradable polymer selected, degradation time can be determined by heating a sample of the polymer to be injected. A water-degradable polymer can be exposed to water or brine and subjected to a thermal history simulating the conditions the polymer would experience in a well where it is to be used. The thermal history of the polymer as it is injected down a wellbore and resides in the wellbore and the subsurface formation while degrading may be simulated in laboratory tests to select the polymer or co-polymers and any additives used with the polymer. The thickness of the polymer phase in a fracture or around a wellbore and in perforations may also be simulated to take into account the diffusion time of water through the polymer or the effects of temperature or other variables on the time for the polymer to be removed from a fracture in a well. Degradation time may be selected to be adequate to complete pumping of the polymer into the formation and to allow opening the well to production within a few days. Preferably, degradation time is in the range from about 1 hour to about 100 hours at conditions in the formation, but longer degradation times may be desirable in some well conditions. For example, in forming a fracture before gravel-packing a well or performing any other completion or workover operation on a well, it may be desirable to allow several days for the other well operations to be completed before the polymer degrades. Before polymer degradation, loss of fluids to the fracture will be prevented and permeability damage to the fracture will be avoided. This can provide much higher permeability in propped fractures when the polymer degrades and the well is placed in use.

"Degradation time" refers to the time for a degradable polymer to become flowable from the fracture. The viscosity of the polymer will decrease before the degradation time has elapsed and most of the polymer may be displaced before the polymer becomes soluble. Experiments reported in U.S. Pat. No. 4,716,964, which is incorporated by reference herein, illustrate how the D, L-polylactide, which was initially a rigid solid, degraded to a compliant thermoplastic mass, to a sticky semi-solid, to a viscous liquid and finally to a small amount of residue in water. The degradable polymer for the present invention may begin as a rigid solid that is placed in the wellbore where it becomes a viscous liquid having a selected viscosity that can be injected through the perforations and, acting as a fracturing fluid, exert fluid pressure on the rock around the well sufficient to hydraulically fracture the formation. Alternatively, the degradable polymer may be plasticized with a known plasticizing agent, such as a polyhydric alcohol, glycol or other relatively low molecular weight compound that mixes with the polymer to decrease its viscosity before it is placed in a wellbore. In another alternative, the polymer is polymerized to the molecular weight range in which is has the desired flow properties without significant addition of plasticizers or other additives. In addition to the D, L-polylactide disclosed above, a polylactide formed from 13 percent D-isomer and 87 percent L-isomer, available from Cargill-Dow, also degrades to form a viscous liquid in the presence of water. At the boiling point of water, the time to form viscous liquid was several hours. A polylactide containing only about 6 percent D-isomer did not degrade to a viscous liquid under the same conditions, but formed primarily a crystalline polymer. Therefore, the relative amount of D- and L-isomer should be selected in the range from about 10 percent to about 90 percent of an isomer. It is believed that isomer compositions in this range form an amorphous polymer and the lower molecular weight polymers and the oligomers formed during degradation form less crystalline material, allowing formation of the viscous liquid during degradation of the polymer.

The degradable fracturing fluid disclosed herein may be placed in wellbore 10 (FIG. 1) by pumping the viscous polymer down the well from the surface as fracturing fluids of the prior art are pumped; however, the high viscosity of the polymer will severely limit pumping rate unless the degradable polymer continues to polymerize after its placement in a wellbore. Polymers that are placed in a wellbore before polymerization is complete may be used according to the teachings herein, and such degradable polymer is included in the methods disclosed herein, although the following description applies to polymers that are polymerized to a viscous material that cannot be pumped alone at practical rates through thousands of feet of well tubulars (casing, tubing or work strings). Therefore, methods are needed for placing relatively small amounts of high-viscosity (greater than about 0.1 poise) fracturing fluid in a wellbore near a selected interval of the formation where the fluid is to be injected without incurring the normal high pressure losses in the wellbore as the fracturing fluid is injected into the formation to form a hydraulic fracture.

In one embodiment, the high-viscosity fracturing fluid of this invention, which will be referred to as a degradable polymer, is placed in the wellbore in the form of pellets or particles and transported through tubulars in the wellbore while dispersed in a low-viscosity carrying fluid. The degradable polymer is then accumulated in the wellbore at a selected location, preferably in the casing near and above the perforations, so that it becomes a continuous or external phase. Some amount of carrying fluid will then become dispersed (i.e., become the discontinuous phase) in the degradable polymer. The carrying fluid is preferably brine or oil. The fractional volume of degradable polymer in the carrying fluid-degradable polymer mixture when it is being pumped down the well should be in the range such that polymer is not the continuous phase or such that lubricated flow of the polymer occurs in the tubing until the polymer is near the depth it is to be injected. Surfactants and polymers soluble in the carrying fluid may be added to the carrying fluid to decrease viscous losses during placement of the polymer pellets in the well or to prevent polymer pellets sticking together or to surfaces or to enhance polymer placement in other ways. The pellets may have a distribution of particle sizes selected to allow closer packing of the degradable polymer particles when they are accumulated in the wellbore to form a continuous phase. When degradable polymer becomes the continuous or external phase, the fraction of degradable polymer will have increased to greater than about 50 percent by volume. Higher degradable polymer fractions are preferred because proppant concentration in the fracturing fluid and the fracture will be increased. A slurry of polymer particles in placement fluid may be pumped to the perforations, at which time flow rate will drop to zero or near zero and following polymer particles in the tubulars may be allowed to settle by gravity and accumulate in the wellbore. In another embodiment, polymer particles are accumulated or concentrated in the wellbore by centrifugal or other solid-liquid separation methods near the depth where the polymer is to be injected.

FIG. 2 illustrates configurations of degradable polymer and proppant that may be used as materials in the disclosed process and their changes in configuration in the wellbore. In FIG. 2(*a*), pellets 22 made of degradable polymer 24 are illustrated. They may be cylinders, as shown, spheres, or any other shape. Cylinders may be formed by an extrusion and chopping process, for example. The dimensions of cylinders may be, for example, from about 1/16 inch to about 1-inch diameter and length. A distribution of sizes may be used to form a mixture of pellets that allows closer packing when the pellets settle by gravity or are filtered against a barrier in the wellbore. The pellets may be dispersed in carrier fluid 28 to form a polymer phase in which the polymer is the internal phase. Additives to increase the specific gravity of the pellets may be added in the form of particles of mineral, preferably a water-soluble mineral, or dust-size particles if they are not soluble. Low density particles, such as syntactic foam or hollow glass beads may be added to decrease specific gravity of the pellets. Referring to FIG. 2(*b*), coating 23 of encapsulating material designed to decrease stickiness of the pellets may be added, as shown in a cross-section of particle 22. Such encapsulating materials, such as high polymers and colloidal silica, are well known. In FIG. 2(*c*) pellets 25 containing proppant 26 dispersed in degradable polymer 24 are illustrated. Proppants such as silica sand, often used in hydraulic fracturing of wells, may be used. A preferred proppant is a ceramic material such as ECONOPROP, CARBOPROP or CARBO HSP, available from CarboCeramics, Inc. of Irving, Tex. Preferably, smooth and nearly round ceramic proppant particles, made by processes known in the industry, are used. In FIG. 2(*d*) element 27 of polymer-phase fracturing fluid, formed when polymer 24 in pellets 22 becomes the continuous phase and encloses carrier fluid 28, is illustrated. Finally, FIG. 2(*e*) illustrates element 29 of proppant-laden polymer-continuous liquid phase fracturing fluid, formed when polymer 24 in pellets 25 becomes the continuous or external phase and carries proppant 26 along with dispersed carrier fluid 28 into a fracture.

When the polymer degrades, fluid flow can then occur through the proppant carried into a hydraulic fracture. When the term "degrades" or similar terms are used herein, it should be understood that some amount of non-soluble compounds might be present to form a residue after a fraction of the polymer has degraded. The residue may be caused by impurities in the polymer, for example, or large macromolecules left after the degradation reactions. The residue may decrease flow capacity through the proppant after polymer degradation, and therefore should be maintained at low values, preferably less than about 20 percent of polymer volume and more preferably less than about 5 percent.

Several processes may be employed to place degradable polymer pellets or particles in a wellbore while dispersed in a carrying fluid. In one embodiment, carrying fluid and pellets of degradable polymer are pumped into a wellbore while displacing the fluid initially present in the wellbore into the formation. When the pellets reach the perforations and pumping pressure increases, pumping is stopped or slowed and time is allowed for additional pellets of degradable polymer to accumulate by settling near and above perforations. The polymer phase is later extruded through the perforations as pressure in the wellbore is increased. In another embodiment, the pellets of degradable polymer may be placed in the well and allowed to fall from the surface to the bottom of the well. In another embodiment, the polymer is placed in a wellbore using a dump bailer. Other methods for placing the degradable polymer fracturing fluid near the zone to be fractured are suitable. A displacement fluid, which should have lower density that the polymer phase, is then used to displace the polymer phase, which may contain the carrier fluid as a discontinuous fluid, through the perforations.

Alternatively, screen 19 (FIG. 1) may be placed in wellbore 10 above perforations 14 and pellets of the polymer may be accumulated above screen 19. When carrying fluid is injected, the screen allows determination of whether pellets of polymer are still dispersed in the carrying fluid or whether the pellets have coalesced to form a continuous polymer phase. Also, a solvent or softening agent may be flowed through pellets accumulated on screen 19 to accelerate the process of the degradable polymer becoming the continuous phase of fluid. Screen 19 may then be opened or released by known methods, such as by shearing a pin, so as to allow polymer phase fracturing fluid, such as shown in FIG. 2(d) or 2(e), to reach perforations 14. A coating may be deposited from a carrier fluid on to tubing 16 and casing 12 (FIG. 1) where they may be contacted by degradable polymer that has begun to degrade or is no longer a rigid solid. Such coating may be used to decrease sticking of the degrading polymer to the walls of the tubing or casing or to increase slip flow of the polymer. Such coating may be a polymer or polymer-wax mixture or other material such as used in encapsulation processes. Ball sealers may be added to the carrying fluid or the degradable polymer pellets. The ball sealers should be designed to remain rigid during the pumping time of the fracturing fluid into a formation. They allow diversion of the flow of the fracturing fluid from one perforation to other perforations when seating of a ball sealer occurs on a perforation. The ball sealers may be conventional rubber-covered balls or degradable ball sealers such as disclosed in U.S. Pat. No. 4,716,964 or any other ball sealers.

Figure 3A:
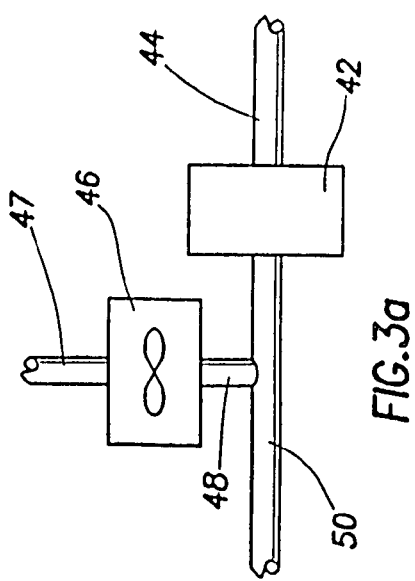
FIGS. 3(a) and (b) illustrate schemes for injecting particles of a viscous fluid such as degradable thermoplastic polymer into a wellbore.

Another method for injecting the pellets of degradable polymer, with or without proppant dispersed in the polymer particles or pellets, is shown in FIG. 1 and FIG. 3(a). Work-string 40 (FIG. 1) has been placed in the well through tubing 16. Work-string 40 may be coiled tubing. A pressure seal will be placed between workstring 40 and tubing 16 with a return flow line and choke (not shown) for return fluid. Work-string 40 is connected to fluid supply line 50.

Figure 3B:
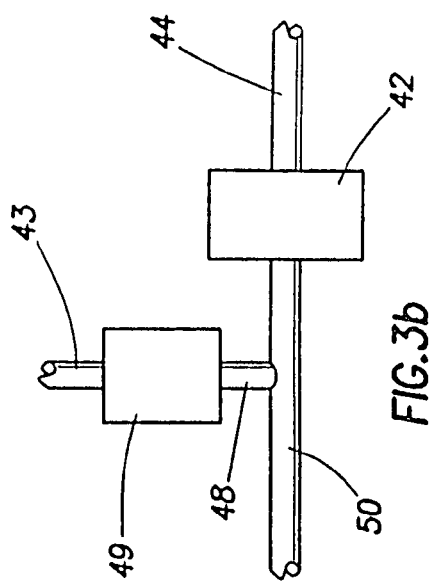

Referring to FIG. 3(a), in one embodiment pump 42 takes suction of carrier fluid through pipe 44. A slurry of carrier fluid and pellets is formed in pressurized vessel 46, which may be stirred. Pressure line 47 may be used to drive the slurry from vessel 46 through line 48. The slurry is mixed with the fluid discharged from pump 42 in fluid supply line 50. Diluted slurry may be then pumped downhole through work string 40 as return fluid 60 flows back to surface. (FIG. 1) Alternatively, the slurry may be pressured downhole directly from stirred tank 46 without dilution and without use of pump 42. In another embodiment, the slurry of polymer phase and carrier fluid may be pumped by slurry pump 49, as illustrated in FIG. 3(b). Pump 49 takes suction through slurry line 43 and discharges through high-pressure slurry line 48 into fluid supply line 50. The pellets placed in the well may contain increasing amounts of proppant as additional pellets of polymer are pumped. For example, a selected amount of polymer pellets that contains no proppant may be pumped first. Plug 62 is preferably placed just below perforations 14 (FIG. 1) before pumping of polymer into the well commences, so that polymer pellets will accumulate in the casing over and above the perforations and not below the perforations. Alternatively, sand or other material may be placed in the wellbore below the perforations. Then low concentrations of proppant in the polymer pellets may be added and the concentration of proppant increased as additional polymer is injected into the well. The size of proppant may also be changed as additional degradable polymer is placed in the well. This requires that pellets of polymer be available with differing concentrations and sizes of proppant. Ball sealers may be added to the carrier fluid as the fluid is pumped downhole, using well known industry methods for ball sealer injection. Ball sealers may also be added to portions of the degradable polymer phase.

In another embodiment (see FIG. 1), work string 40 is not placed in well 10 and tubing 16 is released from packer 18 or a bypass valve (such as a sliding sleeve in tubing 16) is opened and a slurry or a mixture of the slurry and carrying fluid is circulated down tubing 16. In yet another embodiment, the slurry or a mixture of slurry 48 and a pumped fluid is "bullheaded" down tubing 16. The slurry may be pumped or pressured all the way to the perforations or may be displaced to any selected depth in the well from which the polymer pellets may settle by gravity to a location adjacent perforations 14 or on screen 19. The slurry may be displaced with a displacement fluid. Again, polymer pellets having higher concentrations of proppant may be pumped as more degradable polymer fracturing fluid is placed in the well. Water or brine may be used as a carrier fluid. Alternatively, a hydrocarbon liquid such as diesel oil may be placed in the well or used as a carrier fluid. If the degradable polymer is degraded by water, the hydrocarbon may be used to increase degradation rate while the degradable polymer is in the wellbore. Also, hydrocarbon may be used to obtain a higher density difference between pellets and wellbore fluid. If pellet density is less than wellbore fluid density, then pellets may be pumped to the formation where they are to be injected and increased fluid pressure be used to force the pellets into the formation before they rise through the wellbore.

Figure 2A:
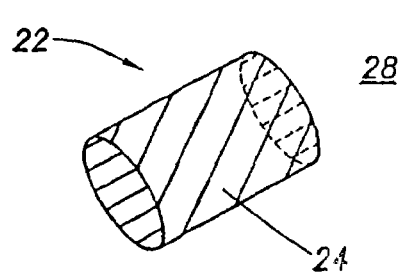
FIGS. 2(a)-2(e) illustrate pellets of degradable polymer with and without proppant and before and after coalescence of the pellets to form a polymer-continuous liquid phase.
Figure 2B:
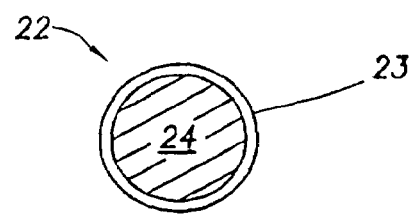

Degradable polymer that contains no proppant particles, such as shown in FIG. 2(a), may be placed in the well first. In this instance, after the polymer has become the continuous phase of the polymer phase, such as shown in FIG. 2(d), it may be forced or squeezed into the formation at fracturing pressures to form a fracture that will not be propped. Such a fracture can increase production rate from some wells after the polymer degrades by removing near wellbore damage, which may include moving solids that are plugging perforations farther from the wellbore or perforations. Also, the hydraulic fracture formed in the formation may not completely close after it is formed, allowing greater flow rate into the well after the fracturing fluid has degraded.

Figure 2C:
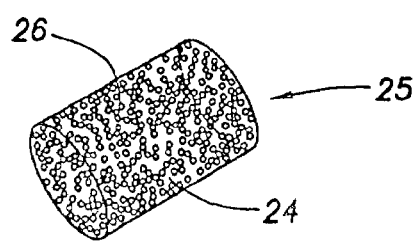
Figure 2D:
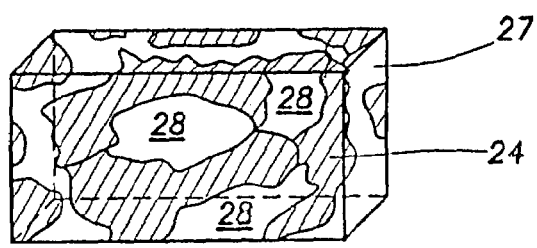
Figure 2E:
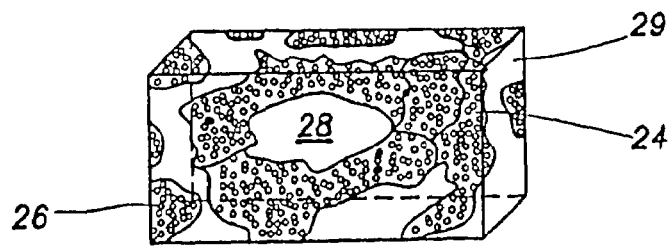

Polymer containing proppant particles, such as shown in FIG. 2(c), may be injected just as described above for degradable polymer without proppant. After the polymer has become the continuous phase of the polymer phase, such as shown in FIG. 2(e), it will be necessary that the pressure applied to the wellbore to squeeze polymer through the perforations be adequate to open a fracture wider than the diameter of the proppant particles. The pressure required will depend on the properties of the rock, the viscosity of the degradable polymer and the diameter of the proppant particles. If the rock is soft enough (low modulus), the effective polymer-phase viscosity is high enough and the proppant diameter is small enough, proppant-laden degradable polymer may be injected to form a hydraulic fracture without the necessity of first injecting a "pad" of degradable polymer. For the polymer phase to have high effective viscosity in a fracture, lubricated or slip velocity of the polymer phase at the wall of the fracture must be controlled. This may require that polymer phase be the continuous phase of the fracturing fluid. Normal stress effects, such as occur during flow of thermoplastic polymers (to cause "die swell," for example), during flow of the polymer phase may assist in widening the fracture when the degradable polymer is a thermoplastic polymer. In some fracturing conditions, slip flow in the fracture may be desirable and in other fracturing conditions materials and method are needed to prevent slip flow in a hydraulic fracture. Without lubricated or slip flow, a highly viscous fracturing fluid can be used to form a short fracture, but a fracture that is long enough to extend beyond a damage zone around a well, with a relatively small amount of fracturing fluid.

Alternatively, degradable polymer without proppant dispersed therein may be first injected as a pad fluid to form a hydraulic fracture. Polymer containing proppant may then be injected. The proppant-free polymer will be placed in the wellbore first. Layers of polymer containing increasing sizes or concentrations of proppant may also be successively placed in the wellbore. Alternatively, proppant-containing polymer may be placed in the wellbore after proppant-free polymer has already been injected into the formation and before the proppant-free polymer has degraded enough to allow leak-off of the polymer into the formation. This time will be less than the degradation time of the polymer. Measurements of viscosity of the polymer during degradation versus time may be used to determine the time available to place more polymer in the wellbore for injecting into the formation before the previously formed fracture has closed. A displacement fluid used to squeeze or displace the fracturing fluid from the wellbore into the formation should have lower density than the polymer phase fracturing fluid. This density difference prevents or minimizes "fingering" of displacement fluid through the polymer phase in the wellbore.

Figure 4A:
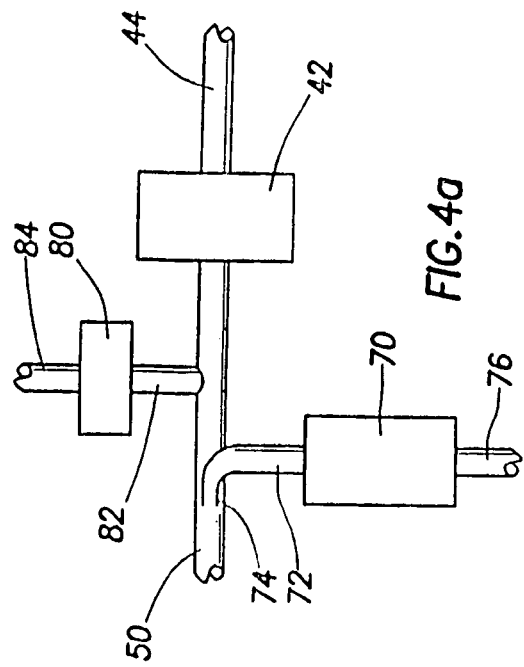
FIGS. 4(a) and (b) illustrate schemes for extruding a continuous phase of a viscous fluid such as a degradable thermoplastic polymer into a stream entering a wellbore.

An alternative procedure and surface equipment for placing degradable polymer in a wellbore and moving it downhole to a location near an interval where it is to be injected into the formation to be fractured is shown in FIG. 4(a). Here pump 42 brings carrier fluid into fluid line 50 as described before and degradable polymer is injected or extruded into line 50 by pump 70, which has feed line 76. Line 72 conveys polymer to orifice 74, which feeds polymer into the flow in pipe 50. Orifice 74 may have a diameter almost as great as line 50 or it may be much smaller, depending on the quantities and size of polymer to be used to form a polymer phase to be injected into a well. Line 50 may have the same inside diameter as the tubing in the well. Pump 70 may be of the type ordinarily used in injection molding or extrusion of thermoplastic polymers. The polymer may be heated before pumping. Such progressing cavity pumps are available from Blackmer Flow Technologies, Inc. of Calgary, Alberta, Canada, for example. In another embodiment, illustrated in FIG. 4(b), polymer in cylinder 90 is pressured through line 94 and orifice 96 into flow line 50. Pressure is supplied to cylinder 90 behind piston 91 through line 92. In the embodiment illustrated in FIG. 4(a) or 4(b), flow rate of polymer may be adjusted such that polymer phase is not the continuous phase in the wellbore or such that wall slip prevents high friction loss in tubulars as the polymer is placed near the interval in the wellbore where it will be injected into the surrounding formation. Also, in either embodiment, chemicals may be injected in flow line 50 by chemical pump 80, fed by line 84, and discharged through line 82. Chemicals to prevent polymer sticking to the wall of tubulars or to other polymer surfaces, such as colloidal silica, or other encapsulating chemicals may be injected at this point. In one embodiment, excess water that is used to pump polymer to near the depth where it is to be injected into a formation is removed by allowing the excess water, which will be in an external water phase, to flow into the annulus through a filter section near the bottom of the tubing (not shown). Using this procedure, the polymer phase will have higher effective viscosity in a hydraulic fracture.

Figure 4B:
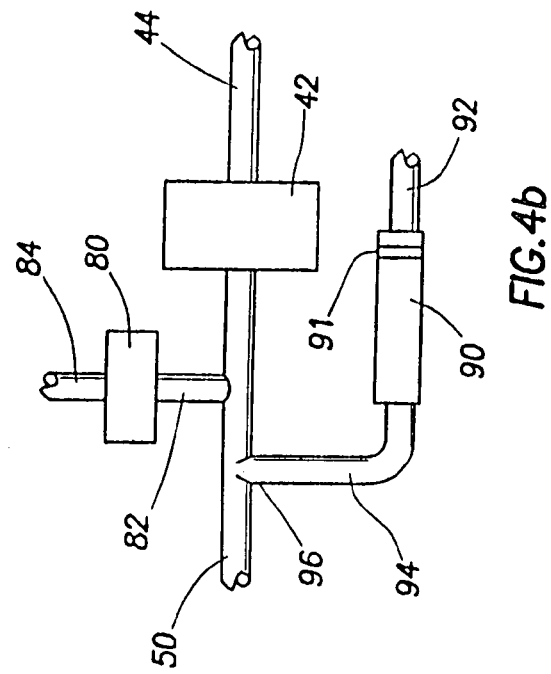

The methods of polymer injection illustrated in FIGS. 4(a) and 4(b) may be particularly appropriate for injecting degradable polymer at the end of conventional fracturing treatments, where accumulation of polymer in the wellbore before injection into the formation may not be necessary, but may also be used to inject degradable polymer into a wellbore for any application, including those in which polymer is accumulated in the wellbore. Most of the injection methods described above include accumulation of polymer in the wellbore so as to minimize or eliminate slip flow of polymer in the fracture. These applications include use in a well to form a short initial fracture, to place proppant in an existing fracture or replace damaged proppant in an existing fracture. Preferably, some of the polymer phase contains proppant, but benefits in some wells may be realized without proppant in the polymer phase.

In other embodiments, the polymer phase may be injected, using methods illustrated in FIGS. 3 and 4, for example, immediately after the fluids used in a conventional fracturing treatment have been pumped into a wellbore and before the "flush" of the conventional fluid and proppant to the perforations. The presence of the polymer phase, preferably containing proppant, in the perforations and in the fracture near the wellbore can have at least two beneficial effects: (1) it can prevent flowback of proppant into the wellbore if a zero or positive pressure from the wellbore into the fracture is maintained long enough for the fracture to close. The fracture will close or almost close with polymer near the wellbore preventing movement of fluid between perforations and in the fracture near the wellbore. By the time the degradable polymer has become flowable, the walls of the fracture will prevent movement of proppant out of the fracture. Degradation time of the polymer should be selected to be long enough such that the zero or positive pressure into the formation can be maintained until the fracture closes. (2) The degradable polymer can prevent "overflushing" of proppant away from the wellbore, leaving unpropped fracture very near the wellbore.

Proppant in the polymer, which will be kept near the wellbore by high viscosity of the polymer, will remain in the fracture all the way to the wellbore and will prevent closing of the fracture at that location. Then the long fracture created and propped by conventional materials can conduct fluids into the well with greater efficiency.

In another embodiment not employing water-degradable polymer, the degradable polymer is injected into the wellbore as a solid or viscous liquid and "degradation" in the formation may be entirely by a process of solution of the polymer or viscous liquid in a liquid that is produced from the formation or that is later injected into the formation. The fracturing fluid (degradable polymer) may be a high-melting point wax, for example, either hydrocarbon or non-hydrocarbon. Rigid pellets of the wax may be placed in a wellbore, with or without proppant, and with or without an encapsulating layer such as shown in FIG. 2(b), and transported to the selected location for converting to the continuous phase and injection into a formation using the methods disclosed above. Alternatively, the polymer may be a high-viscosity liquid, such as a crude oil or refined oil. Time may be allowed for the wax pellets or viscous liquid to heat and fuse or flow together to form a continuous polymer phase that encloses the carrier fluid. Alternatively, the pellets or viscous liquid may be accumulated on a screen and a softening agent or solvent may be displaced down to the pellets or liquid, causing particles to fuse or flow together. The same results may be achieved as with the degradable polymer that is converted to water-soluble compounds in a formation, although time after the treatment to achieve maximum production rate from a well may be increased. Alternatively, the degradable polymer may be a polymer that is thermally unstable at the temperature of the formation. Such polymers are well known, particularly when high-temperature formations are being treated. Such materials are included in the term degradable polymer for purposes of the instant disclosure.

A thermoplastic polymer should be capable of carrying high concentrations of proppant. Technology that can be applied to increase proppant concentration in the polymer has been developed in the field of metallurgy. Powder injection molding (PIM) is a rapidly growing technology for forming parts by sintering of metal, ceramic and other particles. In that technology, particles are dispersed in a mixture of a thermoplastic with materials such as stearic acid and wax for transport into a mold. A "green" solid is formed that is later sintered after the organic materials are removed at high temperature. U.S. Pat. No. 5,641,920, for example, discloses a composition of "binder" systems that may be used to carry particles into molds. Volume ratio of solids in the binder-particle mixture is commonly 50-60 percent. U.S. Pat. No. 5,602,197 teaches use of a thermoplastic binder composition comprising a high molecular weight polymer component and a molten wax component with a ceramic. High volume concentrations of solid particles are disclosed.

To obtain higher concentrations of proppant particles in the degradable thermoplastic polymer, the degradable polymer may be mixed with stearic acid, wax and other additives, such as disclosed in U.S. Pat. Nos. 5,641,920 and 5,602,197, which are incorporated by reference herein. The additives enhance flowability of the proppant-containing polymer and allow higher concentrations of proppant in the plastic to remain flowable.

Additives such as plasticizers may be added to the polymer to control its viscosity or rate of degradation. The mixing of polymer, additives or proppant may occur in a blender using known techniques. Mixing can occur above the melting point of the polymer. The mixture may then be divided into pellets of larger size than proppant particles. For example, pellets may be formed by extruding the polymer-proppant mixture in a cylindrical shape having a diameter in the range from about $\frac{1}{10}$ inch to about 1 inch and the cylinder may be cut into pieces having a length about equal to the diameter. Larger or smaller sizes may be used. A shaping process, such as tumbling or heating above the melting temperature while dispersed in an immiscible liquid, may be used to make the pellets more nearly round. Such roundness may increase the packing density of the pellets. The pellets may be stored under conditions to avoid sticking of the pellets. A dry medium such as dry gas or dry organic liquid around the pellets may be used, for example. Moisture is preferably to be minimized or avoided before use of polyester degradable polymer fracturing fluid. Alternatively, the pellets may be formed at a well-site by extrusion or other process and promptly injected into the well. In another embodiment, the polymer is mixed with proppant and additives as needed and kept in a vessel to feed pump 70 of FIG. 4(a) or placed in cylinder 90 of FIG. 4(b).

After polymer is placed in a well, the polymer, at least some of which usually containing proppant particles, will normally occupy from several feet to hundreds of feet near and above the perforations in the casing. For example, if a fracture is to be formed having a height of 50 feet, a length of 10 feet in each of two directions from the well and a width of 0.05 foot, the volume of continuous phase polymer required will be 50 ft$^3$. Common production casing sizes have a cross-section area in the range of 0.25 ft$^2$. Therefore, about 200 ft of polymer phase, after settling or compacting in casing, will be adequate to form the fracture. The polymer may also extend into the tubing. After placement in the wellbore and possibly allowing time for the degradable polymer to reach a preferable viscosity range, if it is too rigid when placed in the wellbore, the polymer is pressured into the formation around the well. A time after polymer placement and before pressuring into the formation may be allowed for the polymer pellets to increase in temperature and become less rigid or viscous. For example, the polymer may decrease in rigidity or viscosity and may deform to form a lower porosity mass, with polymer enclosing the carrying fluid used to place the pellets in the well to form a polymer-continuous polymer phase.

FIG. 1 shows interval 52 of casing 12 that is filled with degradable polymer without proppant. (Screen 19 will not be present in the well in this example. When screen 19 is present, the bottom of interval 52 will be at the screen.) Higher in the casing, to be injected after the polymer in interval 52, is interval 54 of degradable polymer having proppant dispersed therein. Additional intervals of casing 12 or tubing 16 may be filled with degradable polymer containing increasing concentrations or increasing size, or both, of proppant.

Preferably, after the degradable polymer has become continuous in the polymer phase, a surface pressure is applied to the wellbore at the surface, normally through tubing 16 or workstring 40, to pressure or displace the polymer phase containing degradable polymer, which may contain proppant, through perforations 14 and into formation 20. The pressuring fluid will normally be the same as the carrying fluid. The pressuring fluid should have lower specific gravity than the polymer phase.

After proppant-laden polymer in a polymer phase has been squeezed through the perforations, the polymer is allowed to degrade before the well is placed in use (i.e., placed on production or injection). Degradation time can be estimated from laboratory experiments in which the polymer is placed in brine at the temperature estimated for temperature in the wellbore and in the fracture in the formation being treated. After sufficient degradation time of the polymer, the well can be produced or fluid can be injected at higher flow rates than before the fracturing treatment. This result may be achieved because the fracture extends through a damaged zone near the wellbore or the new proppant bed in the fracture connects a pre-existing fracture to the wellbore with higher flow capacity, or overflushing or backflow of proppant after a conventional fracturing treatment has been avoided.

If a well is to be gravel packed in a particular formation or zone, a fracture can be formed in that zone using the methods and materials disclosed herein and the degradation time of the polymer can be selected to allow placement of a screen or other equipment in the well and gravel packing outside the screen while the fracture is still plugged with degradable polymer. The fracture in the first zone may be performed down the casing, using appropriate placement techniques such as described above. For example, the plastic may be placed in casing over a bridge plug set at the bottom of perforations into the zone to be fractured. A packer set above the plastic in the casing and the bridge plug on a work string can be used to displace the plastic through the perforations. Other operations in the wellbore can be performed while the fracture in the first zone is still plugged with degradable polymer. Several zones may be fractured and operations may be performed in the wellbore, such as placement of a screen for gravel packing all the fractured zones and placement of the gravel, before the polymer in the fractures has degraded. Recompletions, stimulation processes or any other wellbore process can be carried out in other zones without damaging the previously fractured zone or losing fluid from the wellbore into that zone during the time the degradable polymer has not degraded.

While particular preferred embodiments of the present invention have been described, it is not intended that these details should be regarded as limitations upon the present invention, except as and to the extent they are included in the following claims.

What I claim includes:

1. A well treatment method for treating a formation around a wellbore, the formation having a fracturing pressure, comprising:
   (a) injecting a degradable thermoplastic polymer as a liquid into a fluid stream;
   (b) transporting the polymer down the wellbore in the fluid stream;
   (c) displacing a polymer-continuous liquid phase comprising the degradable thermoplastic polymer from the wellbore into the formation at a pressure greater than the fracturing pressure of the formation.

2. The method of claim 1 wherein the degradable polymer comprises a water-degradable polymer.

3. The method of claim 2 wherein the water-degradable polymer comprises a polyester.

4. The method of claim 3 wherein the polyester comprises a polylactide.

5. The method of claim 4 wherein the polylactide is poly (D, L-lactide).

6. The method of claim 4 wherein the polylactide is a mixture of isomers having a composition in the range from about 10 percent D-isomer to about 90 percent D-isomer.

7. The method of claim 1 further comprising the step of performing another operation in the wellbore after step (c) and before allowing a time for the degradable polymer to degrade.

8. The method of claim 7 wherein the other operation in the wellbore is gravel packing.

9. The method of claim 1 wherein the liquid degradable thermoplastic polymer is injected into the fluid stream by a pump.

10. The method of claim 9 further comprising the injection of other chemicals into the fluid stream along with the liquid degradable thermoplastic polymer.

11. The method of claim 1 wherein the liquid degradable thermoplastic polymer is injected into the fluid stream from a pressurized cylinder.

12. The method of claim 11 further comprising the injection of other chemicals into the fluid stream along with the liquid degradable thermoplastic polymer.

13. The method of claim 1 further comprising after step (b) the step of allowing a time for the degradable polymer to form the polymer-continuous liquid phase in the wellbore.

14. The method of claim 1 wherein the polymer-continuous liquid phase, having a specific gravity, is displaced from the wellbore by a fluid having a lower specific gravity than the specific gravity of the polymer-continuous liquid phase.

15. The method of claim 1 further comprising the step after step (c) of allowing a time for the degradable polymer to degrade.

16. The method of claim 1 further comprising the step of forming a hydraulic fracture in the formation around the wellbore and then performing step (a), step (b) and step (c) before closure of the hydraulic fracture.

17. The method of claim 1 further comprising the step of forming a hydraulic fracture in the formation around the wellbore and then performing step (a), step (b) and step (c) after closure of the hydraulic fracture.

18. The method of claim 1 wherein at least a portion of the degradable polymer contains a proppant.

19. The method of claim 1 further comprising the step of transporting ball sealers down the wellbore along with or following the degradable polymer.

* * * * *